(12) United States Patent
Matsumoto

(10) Patent No.: US 6,888,799 B2
(45) Date of Patent: May 3, 2005

(54) SDH TEST APPARATUS AND SDH TEST METHOD

(75) Inventor: Hisashi Matsumoto, Atsugi (JP)

(73) Assignee: Anritsu Corporation, Tokyo (JP)

( * ) Notice: Subject to any disclaimer, the term of this patent is extended or adjusted under 35 U.S.C. 154(b) by 813 days.

(21) Appl. No.: 09/758,786

(22) Filed: Jan. 11, 2001

(65) Prior Publication Data

US 2001/0008526 A1 Jul. 19, 2001

(30) Foreign Application Priority Data

Jan. 19, 2000 (JP) .................................... 2000-009739

(51) Int. Cl.$^7$ ............................................. G01R 31/08
(52) U.S. Cl. ..................... 370/241; 370/907; 370/412; 370/357
(58) Field of Search .................. 370/357, 241, 370/242, 248, 352, 375, 378, 377, 379, 412, 470, 505, 506, 907, 476, 252; 714/724, 712

(56) References Cited

U.S. PATENT DOCUMENTS

| | | | | |
|---|---|---|---|---|
| 5,781,597 A | * | 7/1998 | Owen et al. | 375/372 |
| 5,870,403 A | * | 2/1999 | Egoshi | 370/503 |
| 5,983,365 A | | 11/1999 | Van de Pol et al. | |
| 6,188,685 B1 | * | 2/2001 | Wolf et al. | 370/378 |
| 6,603,776 B1 | * | 8/2003 | Fedders et al. | 370/476 |

FOREIGN PATENT DOCUMENTS

| | | |
|---|---|---|
| EP | 0 727 892 A | 8/1996 |
| GB | 1 261 749 A | 1/1972 |
| WO | WO 94/13073 A | 6/1994 |

* cited by examiner

*Primary Examiner*—Brian Nguyen
(74) *Attorney, Agent, or Firm*—Frishauf, Holtz, Goodman & Chick, P.C.

(57) ABSTRACT

A SDH test apparatus substitutes a part of payload of received SDH data with a desired data and transmits. A FIFO memory is installed between the Rx AU processor and the Tx AU processor, stores sequentially AU data extracted by the Rx AU processor and outputs to the Tx AU processor in the order of memorization. An AU pointer processor outputs an AU pointer adjusting the number of data in the FIFO memory, allowing the Tx AU processor to read in payload of AU data, after a time lag ($\Delta T2 + \Delta T4$) of information leading head position of payload generated by the processing of AU data by the Rx AU processor and the Tx AU processor, by extracting the number of data in the FIFO memory. The Tx AU processor is composed to read out the payload of AU data from the FIFO memory, generate AU data and output to the Tx SOH processor so that the information leading position is at the position designated by the AU pointer value output from the AU pointer processor.

4 Claims, 4 Drawing Sheets

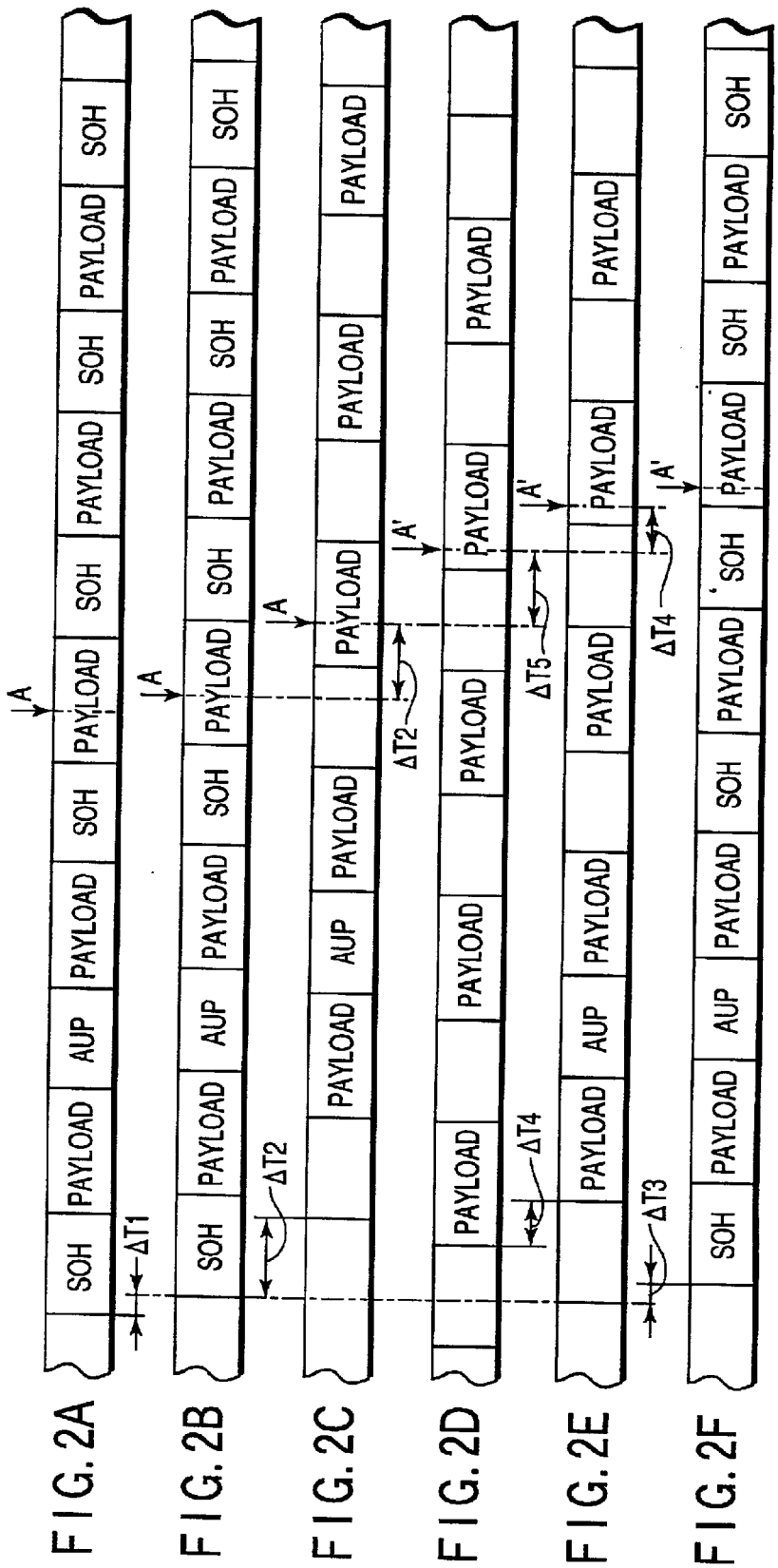

SDH TEST APPARATUS AND SDH TEST METHOD

CROSS-REFERENCE TO RELATED APPLICATIONS

This application is based upon and claims the benefit of priority from the prior Japanese Patent Application No. 2000-009739, filed Jan. 19, 2000, the entire contents of which are incorporated herein by reference.

BACKGROUND OF THE INVENTION

The present invention relates to a SDH test apparatus and a SDH test method, and particularly a SDH test apparatus for substituting a part of payload of received SDH data with a desired data and transmitting, wherein the time difference between processing for SOH portion and processing for AU portion can be absorbed by a simple configuration and a SDH test method.

Conventionally, in the STM (synchronized transfer mode) system for multiplexing a plurality of series of data in synchronization and transferring, SDH (synchronized digital hierarchy) data is used.

As it is well known, there are various standards for STM, and as for SDH data prescribed by the most basic STM-1, one frame is composed of a SOH (section overhead) portion of 9×9 bytes and a payload of 261×9 bytes, as shown in FIG. 5.

As shown in FIG. 6, as for SDH data, SOH portion and payload are transferred alternatively by 9 bytes and 261 bytes respectively.

Here, information is inserted into the payload of SDH data taking a position A (this position is a position later in time than the AU pointer AUP insertion position) indicated by the value of AU (administrative unit) pointer AUP inserted at the fourth byte of SOH portion as leading head position.

Before testing the operation of systems or the like for data communication using this SDH data, sometimes it is desired to test by substituting a part of payload of SDH data to be transferred with a desired data (for instance, pseudo random signal).

In order to insert a desired data into a part of payload of SDH data and output in this way, it is necessary to proceed as follows.

First, SOH portion and payload are extracted from the input SDH data, and a desired data is inserted into a desired position of the payload for generating data for transmission.

Next, SDH data frame is generated based on this generated data and SOH data extracted from the reception data and output.

However, when a new data is generated by rewriting a part of payload, as it takes longer time than the processing time of SOH data, it is inconvenient to generate a frame data by simply combining SOH portion of received SDH data and data of newly generated payload section.

In other words, that is, if, frame data is generated by a simple combination as mentioned above, information lead head position is shifted by the difference of payload processing time and SOH data processing time.

In order to solve this problem, in the prior art, the processing of SOH data is delayed according to data processing time of the payload.

FIG. 7 shows a configuration of a SDH test apparatus 10 of the prior art for generating SDH data by delaying the processing for SOH data.

This SDH test apparatus 10 comprises a reception SOH processing portion (Rx SOH processor) 11 for performing various processing including frame detection of received SDH data, channel selection, detection of data inserted into the SOH portion, error check or others, a reception AU processing portion (Rx AU processor) 12, a transmission AU processing portion (Tx AU processor) 13 for generating AU data by substituting data of a predetermined position of the payload of data extracted by the Rx AU processor 12 with a desired data, a delay processing portion 14 for delaying SOH data processed by the Rx SOH processor 11 by the data processing time by the Tx AU processor 13 and outputting, and a transmission SOH processing portion (Tx SOH processor) 15 for generating and outputting SDH frame data, based on AU data generated by the Tx AU processor 13 and SOH data from the delay processing portion 14.

Thus, SDH data of which data at a desired position of AU portion is substituted with a desired data can be output, for input SDH data, by delaying SOH data detected by the Rx SOH processor 11 by the processing time of AU data by the Rx AU processor 12 and the Tx AU processor 13.

However, as mentioned above, in the method of delaying the processing for SOH data, the circuit scale of the delay processing portion 14 increases extremely and inconveniently.

Especially, for the multi-channeled SDH data, the number of delay phase increases and its circuit scale increases extremely as much.

In other words, SOH data of the number of channels is output at a high speed from the Rx SOH processor 11 to the delay processing portion 14.

On the other hand, the Rx AU processor 12 processes AU data of a particular channel.

This is because, during this processing, the delay processing portion 14 must delay and output a quantity of SOH data.

BRIEF SUMMARY OF THE INVENTION

The object of the present invention is to supply a SDH test apparatus and a SDH test method that can solve the problems mentioned above, and absorb the difference of AU data processing time by a simple configuration.

In order to achieve the aforementioned object, according to an aspect of the present invention, there is provided a SDH test apparatus for substituting a part of payload of received SDH data with a desired data and transmitting, comprising:

a Rx SOH processor for performing frame detection of the received SDH data;

a Rx AU processor for extracting AU data composed of AU pointer of data processed by the Rx SOH processor and payload, and detecting an information leading head position designated by the AU pointer;

a Tx AU processor for generating AU data wherein a part of payload of AU data extracted by the Rx AU processor is substituted with a desired data;

a Tx SOH processor for generating a new SDH data with AU data generated by the Tx AU processor and data from the Rx SOH processor and transmitting;

a FIFO memory installed between the Rx AU processor and the Tx AU processor, for storing sequentially payload of AU data extracted by the Rx AU processor and outputting to the Tx AU processor in the order of memorization; and an AU pointer processor for outputting an AU pointer adjusting the number of data in the FIFO memory, allowing the Tx AU processor to read in payload of AU data, after a time lag (ΔT2+ΔT4) of information leading head position of payload generated by the processing of AU data by the Rx AU processor and the Tx AU processor, by extracting the number of data in the FIFO memory, wherein the Tx AU processor is composed to read out the payload of AU data from the FIFO memory, generate AU data and output to the Tx SOH processor so that the information leading position is at the position designated by the AU pointer value output from the AU pointer processor.

In order to achieve the aforementioned object, according to another aspect of the present invention, there is provided a SDH test method for substituting a part of payload of received SDH data with a desired data and transmitting, comprising the steps of:

Rx SOH processing including frame detection of the received SDH data;

Rx AU processing including extraction of AU data composed of AU pointer of data processed by the Rx SOH processing and payload, and detection of the information leading head position designated by the AU pointer;

Tx AU processing including generation of AU data wherein a part of payload of AU data extracted by the Rx AU processing is substituted with a desired data;

Tx SOH processing including generation of a new SDH data with AU data generated by the Tx AU processing and data by the Rx SOH processing and transmission thereof;

storing sequentially AU data extracted by the Rx AU processing between the Rx AU processing and the Tx AU processing in a FIFO memory and transmitting to the Tx AU processing in the order of memorization; and AU pointer processing for outputting an AU pointer adjusting the number of data in the FIFO memory, allowing the Tx AU processing to read in payload of AU data, after a time lag (ΔT2+ΔT4) of information leading head position of payload generated by the processing of AU data by the Rx AU processing and the Tx AU processing, by extracting the number of data in the FIFO memory, wherein the Tx AU processing is composed to read out the payload of AU data from the FIFO memory, generate AU data and output to the Tx AU processing so that the information leading position is at the position designated by the AU pointer value output from the AU pointer processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2F are timing diagrams illustrating the operation of the SDH test apparatus of FIG. 1;

DETAILED DESCRIPTION OF THE INVENTION

Figure 1:
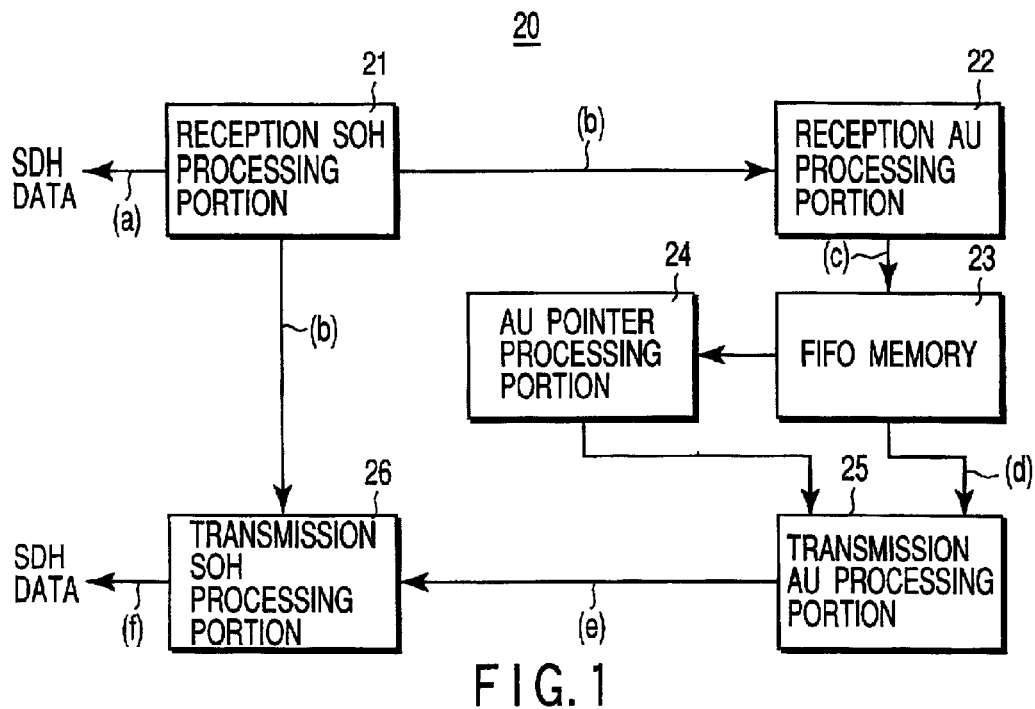
FIG. 1 is a block diagram showing a configuration of one embodiment of the SDH test apparatus and SDH test method of the present invention.

Reference will now be made in detail to the presently preferred embodiment of the invention as illustrated in the accompanying drawing, in which like reference numerals designate like or corresponding parts.

First, the outline of the present invention will be described.

The SDH test apparatus and SDH test method of the present invention are applied to the SDH test apparatus and SDH test method comprising a reception SOH processing portion (Rx SOH processor) 21 for performing a predetermined processing including frame detection of the received SDH data and error check of SOH portion; a reception AU processing portion (Rx AU processor) 22 for performing a predetermined processing including extraction of AU data composed of AU pointer of data processed by the Rx SOH processor and payload, and detection of the information leading head position designated by the AU pointer; a transmission AU processing portion (Tx AU processor) 25 for generating AU data wherein a part of payload of AU data extracted by the Rx AU processor is substituted with a desired data; a transmission SOH processing portion (Tx SOH processor) 26 for generating a new SDH data with AU data generated by the Tx AU processor and data from the Rx SOH processor and outputting, and transmitting by substituting a part of data of payload of received SDH data with the desired data and transmitting.

And, the SDH test apparatus and SDH test method of the present invention comprise a FIFO memory (23) installed between the Rx AU processor and the Tx AU processor, for storing sequentially AU data extracted by the Rx AU processor and outputting to the Tx AU processor in the order of memorization, and an AU pointer processing portion (AU pointer processor) 24 for outputting an AU pointer adjusting the number of data in the FIFO memory, allowing the Tx AU processor to read in AU data payload (payload of AU data), after a time lag (ΔT2+ΔT4) of information leading head position of payload generated by the processing of AU data by the Rx AU processor and the Tx AU processor, by extracting the number of data in the FIFO memory, wherein the Tx AU processor is composed to generate AU data and output to the Tx SOH processor so that the information leading position is at the position designated by the AU pointer value output from the AU pointer processor.

Now, the embodiment of the SDH test apparatus and SDH test method of the present invention based on the outline mentioned above will be described referring to the drawings.

FIG. 1 shows a configuration of a SDH test apparatus of one embodiment to which the SDH test apparatus and SDH test method of the present invention are to be applied.

Namely, the SDH test apparatus of this embodiment is composed as follows.

A shown in FIG. 1, the Rx SOH processor 21 performs various processing including frame detection of input SDH data, channel selection, detection of data inserted in the SOH portion and error check or the like.

The Rx AU processor 22 performs various processing including extraction of AU portion of data processed by the Rx SOH processor 21, error check and detection of the information leading head position, and transmits the extracted AU data to the FIFO (first in first out) memory 23.

The FIFO memory 23 stores AU data output from the Rx AU processor 22 in the order of output thereof, and outputs in the order of memorization.

The AU pointer processor 24 compensates the difference of the information leading position of payload generated by the processing time of AU portion by the Rx AU processor 22 and the Tx AU processor mentioned below, and the delay time to stationarily remain the number of data within the predetermined range in the FIFO memory, by surveying the number of data remaining in the FIFO memory 23, deciding the AU pointer so that this number of data is kept within a predetermined range, and outputting to the Tx AU processor 25.

The Tx AU processor 25 generates AU data so that the information leading position is at the position designated by the AU pointer value decided by the AU pointer processor 24, based on the data output from the FIFO memory 23 and a desired data (for instance, pseudo random data string) generated inside (may be input from the exterior), and outputs to the Tx SOH processor 26.

The Tx SOH processor 26 generates a SDH frame data, based on data from the Rx SOH processor 21 and AU data from the Tx AU processor and outputs.

Next, the operation of this SDH test apparatus shall be described.

As shown in FIG. 2A, if SDH data wherein SOH data of 8 bytes and payload of 261 bytes succeed alternatively is input, the Rx SOH processor 21 performs a predetermined processing such as frame synchronization processing of this SDH data, error check for SOH data or the like.

Then, this Rx SOH processor 21 outputs the processed SDH data, as shown in FIG. 2B, to the Rx AU processor 22 and the Tx SOH processor 26 delaying by the time ΔT1 to the input data.

In FIGS. 2A to 2F, the reference symbol A indicates the information leading head position designated by the AU pointer AUP of the input SDH data.

The Rx AU processor 22 extracts AU portion (AU pointer AUP and payload) from this SDH data, performs a predetermined processing such as error check of this data or the like and, as shown in FIG. 2C, outputs data delayed by the time ΔT2 from the SDH data input from the Rx SOH processor 21.

There, the data from this Rx AU processor 22 is stored successively in the FIFO memory 23.

On the other hand, the AU pointer processor 24 allows to load AU data after the time lag of the information leading position of payload generated by the processing of AU data by the Rx AU processor 22 and the Tx AU processor 25 by deciding the AU pointer so that the number of data in the FIFO memory 23 enters a predetermined range.

In other words, suppose the Tx SOH processor 26, as shown in FIG. 2F, outputs SOH portion and payload alternatively by a delay of ΔT3 to the data (refer to FIG. 2B) from the Rx SOH processor, it is necessary that the Tx AU processor, as shown in FIG. 2E, outputs AU data at a time point earlier by the processing time ΔT3 of the Tx SOH processor 26, namely at the same timing as the data shown in FIG. 2B.

Suppose the processing time of the Tx AU processor 25 be ΔT4, as shown in FIG. 2D, it is necessary that the FIFO memory 23 outputs AU data at a point earlier by ΔT4 than the AU data output from the Tx AU processor 25.

Consequently, suppose there is no delay by the FIFO memory 23, it is impossible to output the data of information leading head position A to the Tx SOH processor before ΔT2+ΔT4 has elapsed from the time point when the data of information leading head position A of input SDH data is output from the Rx SOH processor 22.

However, after ΔT2+ΔT4 has elapsed from the time point when the data of information leading head position A of input SDH data is output from the Rx SOH processor 22, the data of information leading head position A can be output to the Tx SOH processor 26.

And, this data can be placed at an arbitrary position in the payload output from the Tx SOH processor 26.

At this moment, the AU pointer is decided so that data of a predetermined range remains stationarily in the FIFO memory 23.

In other words, data remaining amount of FIFO memory 23 is monitored in frame synchronization, if it is less than the predetermined rage, the AU pointer is increased by one and if it exceeds, the AU pointer is decreased by one.

The value A' of the AU pointer decided in this way, is inserted in the AUP in the frame and, at the same time, the position designated by this value A' becomes the information leading head position.

On the other hand, suppose the delay time up to readout of data of the information leading head position A stored in this FIFO memory 23 be ΔT5, as shown in FIG. 2E, data which was at this information leading head position A is output from the Tx AU processor 25, at the time point (namely A') when ΔT2+ΔT4+ΔT5 has elapsed from the time point when the data of information leading head position A of input SDH data is output from the Rx SOH processor 22.

Thus, the Tx AU processor 25 generates a new AU data by inserting a desired data into a desired position taking the information leading head position A' as reference, and outputs with a delay of the time ΔT4 as shown in FIG. 2E.

The AU data generated by this Tx AU processor 25 is input to the Tx SOH processor 26 with data from the Rx SOH processor 21 and thereby, as shown in FIG. 2F, a new SDH data is generated and output with a delay of the time ΔT3.

Figure 3A:
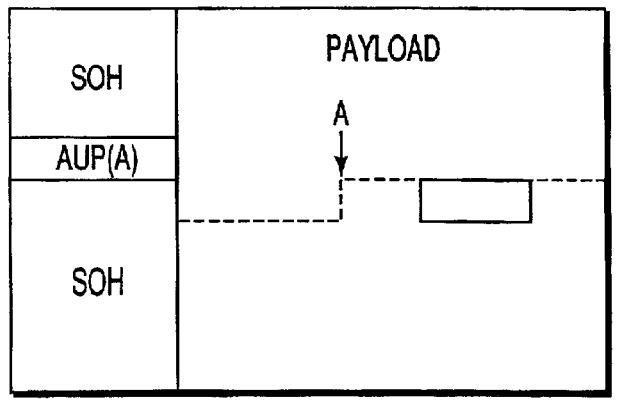
FIGS. 3A and 3B are data format diagrams illustrating the operation of the SDH test apparatus of FIG. 1.
Figure 3B:
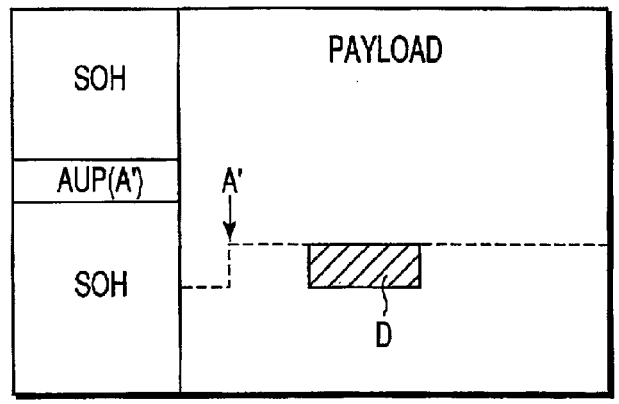

By the processing mentioned above, as shown in FIG. 3A, the information leading head position of the SDH data having the information leading head position at the position A designated by the AU pointer AUP is shifted to the position A' designated by a newly decided AU pointer AUP, so as to include the processing time (ΔT2+ΔT4) for AU data and a delay time ΔT5 for maintaining the FIFO memory 23 data storage state stable, SDH data in converted into one wherein a desired data D is inserted to a predetermined position taking this information leading head position A' as reference and output.

Thus, in the SDH test apparatus 20 of this embodiment, the difference of the information leading head position due to processing delay for AU data being compensated by AU pointer modification processing, the delay processing of SDH data is unnecessary, increase of circuit scale is unnecessary, and SDH data wherein a part of data of payload of received SDH data is substituted with a desired data can be transmitted by a simple configuration.

In the foregoing, it has been described that only AU data is extracted from the received SDH data.

Figure 4:
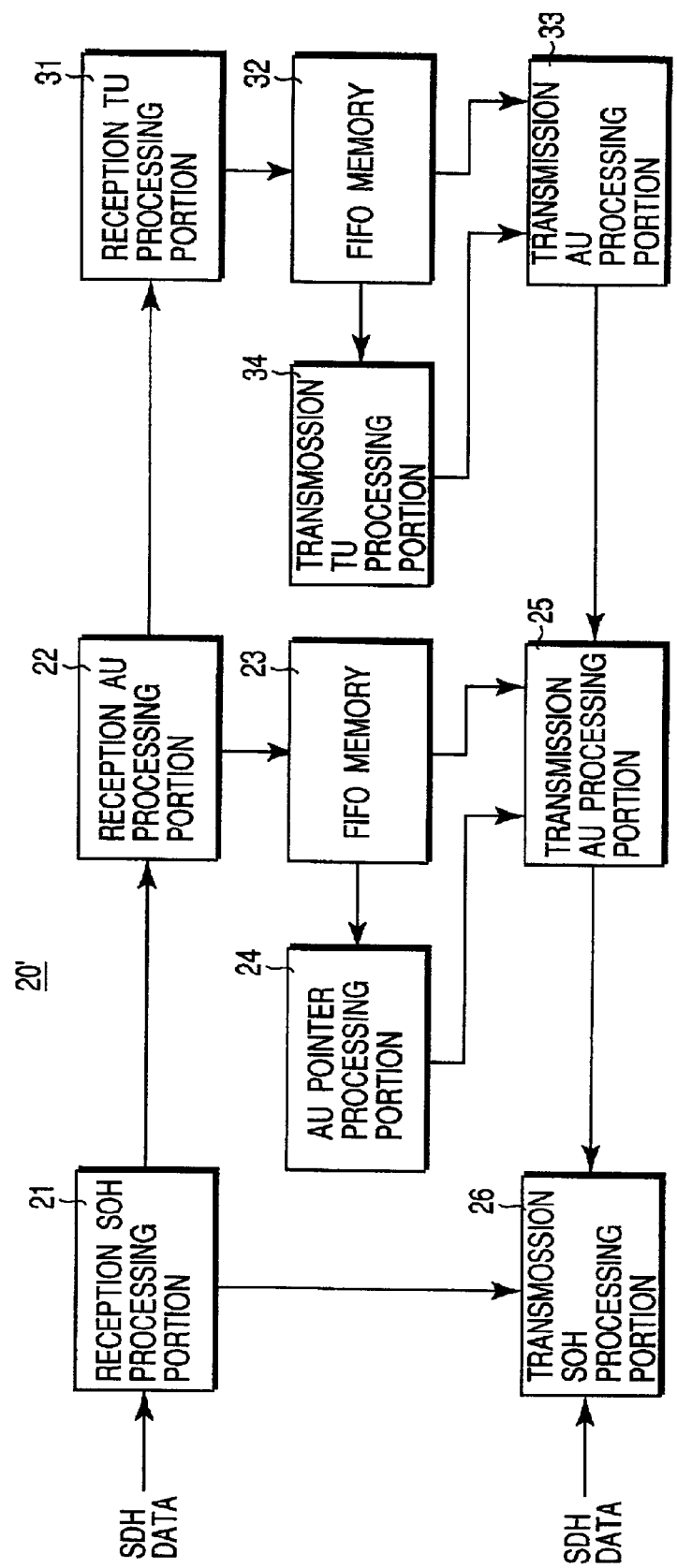
FIG. 4 is a block diagram showing a configuration of a variant of the SDH test apparatus and SDH test method of the present invention.
Figure 5:
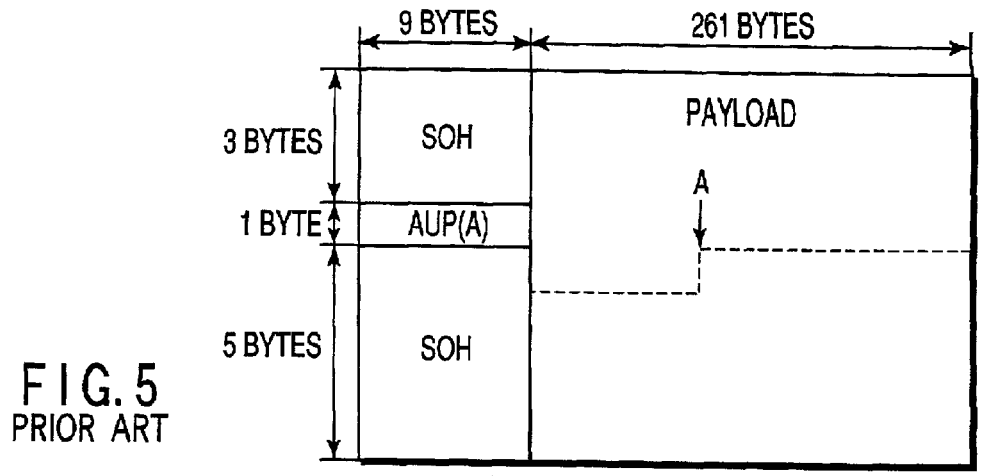
FIG. 5 is a data format diagram of SDH format illustrating the prior art.
Figure 6:
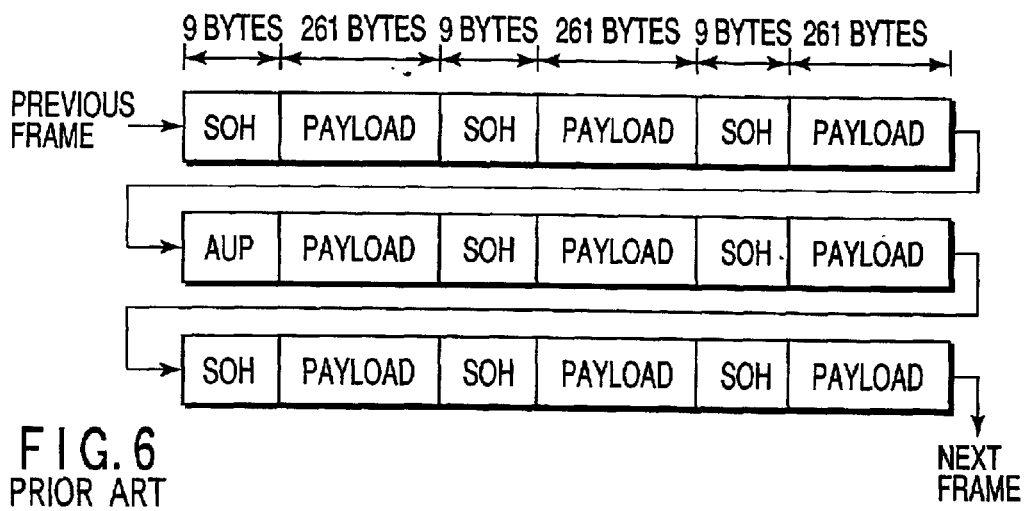
FIG. 6 is a diagram showing a SDH data transfer mode illustrating the prior art.
Figure 7:
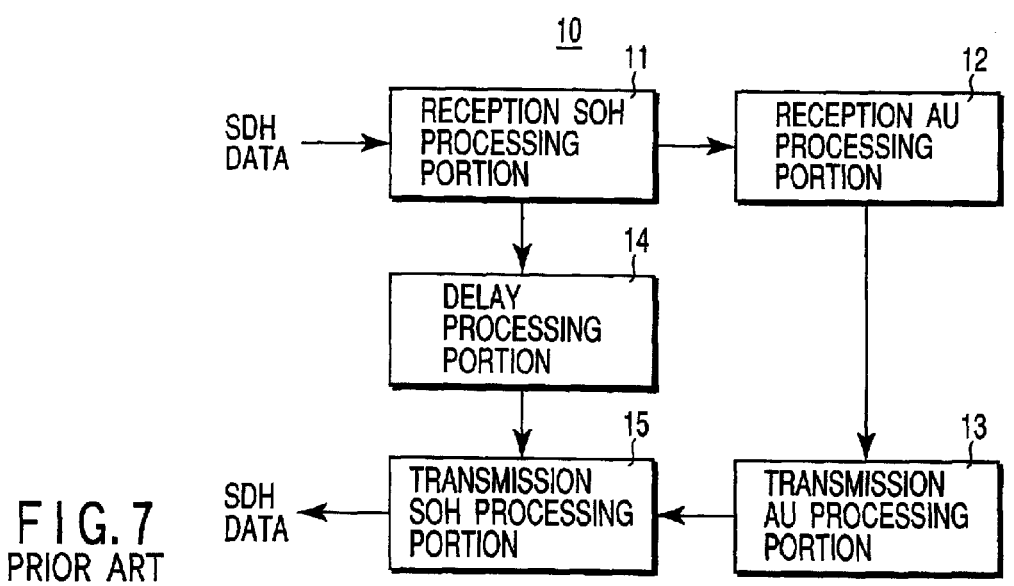
FIG. 7 is a block diagram showing a configuration of an SDH test apparatus of the prior art.

However, it may be composed as SDH test apparatus 20' shown in FIG. 4, if TU (tributary unit) data of deeper level in the payload.

In other words, the SDH test apparatus 20' shown in FIG. 4 is composed to extract TU data by a Rx TU processor 31 from data processed by the Rx AU processor 22, store this extracted TU data successively in the FIFO memory 32, output to the Tx TU processor 33 in the order of this memorization, and at the same time, decide the TU pointer anticipating the information leading head position shifting due to the processing time of TU data by the reception TU processing portion 31 (Rx TU processor) and the transmission TU processing portion 33 (Tx TU processor), the delay time to maintain the FIFO memory 32 data storage state stable, by a TU pointer processing portion 34 (TU pointer processor).

As mentioned above, the SDH test apparatus of the present invention comprises a FIFO memory installed between the Rx AU processor and the Tx AU processor, for storing sequentially AU data extracted by the Rx AU processor and outputting to the Tx AU processor in the order of memorization, and an AU pointer processor allowing to read in AU data, after a time lag of information leading head position of payload generated by the processing of AU data by the Rx AU processor and the Tx AU processor, by deciding the AU pointer value so that the number of data in the FIFO memory is in a predetermined range, and the Tx AU processor is composed to generate AU data and output to the Tx AU processor so that the information leading position is at the position designated by the AU pointer value output from the AU pointer processor.

Consequently, according to the present invention, a SDH test apparatus wherein the delay processing of SDH data is unnecessary, increase of circuit scale is unnecessary, and SDH data whose a part of data of payload of received SDH data is substituted with a desired data can be transmitted by a simple configuration, can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A synchronized digital hierarchy (SDH) test apparatus comprising:

an Rx section overhead (SOH) processor for performing frame detection of received SDH data;

an Rx administrative unit (AU) processor for extracting AU data composed of an AU pointer and a payload from data proccessed by said Rx SOH processor, and for detecting an information leading head position designated by said AU pointer;

a Tx AU processor for generating AU data in which a part of the payload of AU data extracted by said Rx AU processor is substituted with a desired data;

a Tx SOH processor for generating a new SDH data with the AU data generated by said Tx AU processor and the data from said Rx SOH processor and transmitting the new SDH data;

a FIFO memory installed between said Rx AU processor and said Tx AU processor, for sequentially storing payload data of AU data extracted by said Rx AU processor and outputting to said Tx AU processor in an order of memorization; and an AU pointer processor for outputting an AU pointer adjusting a number of data in said FIFO memory, allowing said Tx AU processor to read in the payload of AU data, after a time lag ($\Delta T2+\Delta T4$) of an information leading head position of the payload generated by processing of AU data by said Rx AU processor and said Tx AU processor, by extracting the number of data in said FIFO memory, wherein said Tx AU proccessor is adapted to read out the payload of AU data from said FIFO memory, generate AU data, and output to said Tx SOH processor so that said information leading head position is at a position designated by an AU pointer value output from said AU pointer processor.

2. The SDH test apparatus according to claim 1, further comprising:

an Rx tributary unit (TU) processor for extracting TU data from the data processed by said Rx AU processor;

a second FIFO memory for successively storing the TU data extracted by said Rx TU processor;

a Tx TU processor for performing transmission TU processing for TU data output from said second FIFO memory in an order of memorization; and a TU pointer processor which is adapted to decide a TU pointer anticipating an information leading head position shifting due to a processing time of the TU data by the Rx TU processor and the Tx TU processor and a delay time for stably maintaining a data storage state of said second FIFO memory.

3. A synchronized digital hierarchy (SDH) test method, comprising:

Rx section overhead (SOH) processing including frame detection of received SDH data;

Rx administrative unit (AU) processing including extraction of AU data composed of an AU pointer and a payload from data processed by said Rx SOH processing, and detection of an information leading head position designated by said AU pointer;

Tx AU processing including generation of AU data in which a part of the payload of AU data extracted by said Rx AU processing is substituted with a desired data;

Tx SOH processing including generation of a new SDH data with the AU data generated by said Tx AU processing and the data from said Rx SOH processing and transmission thereof;

sequentially storing the AU data extracted by said Rx AU processing between said Rx AU processing and said Tx AU processing in a FIFO memory and transmitting to said Tx AU processing in an order of memorization; and AU pointer processing for outputting an AU pointer adjusting a number of data in said FIFO memory, allowing said Tx AU processing to read in the payload of AU data, after a time lag ($\Delta T2+\Delta T4$) of an information leading head position of the payload generated by the processing of the AU data by said Rx AU processing and said Tx AU processing, by extracting the number of data in said FIFO memory, wherein said Tx AU processing includes reading out the payload of AU data from said FIFO memory, generating AU data, and outputting to said Tx AU processing so that said information leading head position is at a position designated by an AU pointer value output from said AU pointer processing.

4. The SDH test method according to claim 3, further comprising the steps of:

Rx tributary unit (TU) processing for extracting TU data from the data processed by said Rx AU processing;

successively storing the TU data extracted by said Rx TU processing in a second FIFO memory;

Tx TU processing for performing Tx TU processing for TU data output from said second FIFO memory in an order of memorization; and TU pointer processing to decide a TU pointer anticipating an information leading head position shifting due to a processing time of the TU data by the Rx TU processing and the Tx TU processing, and a delay time for stably maintaining a data storage state of said second FIFO memory.

* * * * *